(12) United States Patent
Kim et al.

(10) Patent No.: US 6,539,412 B1
(45) Date of Patent: Mar. 25, 2003

(54) DISCRETE WAVELET TRANSFORM APPARATUS FOR LATTICE STRUCTURE

(75) Inventors: Joon-Tae Kim, Seoul (KR); Yong-Hoon Lee, Taejeon (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 0 days.

(21) Appl. No.: 09/384,287

(22) Filed: Aug. 27, 1999

(30) Foreign Application Priority Data

Sep. 4, 1998 (KR) .............................. 98-36504

(51) Int. Cl.$^7$ .......................... G06F 17/14; G06F 17/10
(52) U.S. Cl. ...................................... 708/400; 708/318
(58) Field of Search .................................. 708/318, 400

(56) References Cited

U.S. PATENT DOCUMENTS 4,695,970 A * 9/1987 Renner et al. ............. 708/318
4,884,230 A * 11/1989 Gielis et al. ................ 708/318
5,519,879 A * 5/1996 Carmon ...................... 708/318

\* cited by examiner

*Primary Examiner*—Tan V. Mai
(74) *Attorney, Agent, or Firm*—Fleshner & Kim, LLP

(57) ABSTRACT

A discrete wavelet transform apparatus for a lattice structure is disclosed. This apparatus includes first through M-th lattice lattices installed in series along the length of a selected filter and each having an upper signal path and a lower signal path for supplying an output of the discrete wavelet transform apparatus, a data form transform unit for converting the form of the input signal and supplying to the first lattice stage, and a delay control unit connected between the lattice stages for thereby simplifying the hardware structure and implementing a scalable characteristic with respect to the different resolution levels and different filter lengths.

6 Claims, 13 Drawing Sheets

FIG. 8

| TIME | INPUT | R1 | R2 | R3 |
|---|---|---|---|---|
| 0 | $S^1(0)$ | | | |
| 1 | $S^2(0)$ | $S^1(0)$ | | |
| 2 | $S^1(1)$ | $S^2(0)$ | | |
| 3 | | $S^2(0)$ | $S^1(1)$ | |
| 4 | $S^1(2)$ | | $S^1(1)$ | |
| 5 | $S^2(1)$ | $S^1(2)$ | $S^1(1)$ | |
| 6 | $S^1(3)$ | | | $S^2(1)$ |
| 7 | | | $S^1(3)$ | $S^2(1)$ |
| 8 | $S^1(4)$ | | $S^1(3)$ | $S^2(1)$ |
| 9 | $S^2(2)$ | $S^1(4)$ | $S^1(3)$ | $S^2(1)$ |
| 10 | $S^1(5)$ | $S^2(2)$ | | $S^2(1)$ |
| 11 | | $S^2(2)$ | $S^1(5)$ | $S^2(1)$ |
| 12 | $S^1(6)$ | | $S^1(5)$ | |
| 13 | $S^2(3)$ | $S^1(6)$ | $S^1(5)$ | |

FIG. 12

| TIME | INPUT | R1 | R2 | R3 |
|---|---|---|---|---|
| 0 | a | | | |
| 1 | b | a | | |
| 2 | c | a | b | |
| 3 | d | c | b | |
| 4 | e | c | b | d |
| 5 | f | e | b | d |
| 6 | g | e | f | d |
| 7 | h | g | f | d |
| 8 | i | g | f | d |
| 9 | j | i | f | d |
| 10 | k | i | j | d |
| 11 | l | k | j | d |
| 12 | m | k | j | l |
| 13 | n | m | j | l |

FIG. 13

| TIME | 0 | 1 | 2 | 3 | 4 | 5 | 6 | 7 | 8 | 9 | 10 | 11 | 12 | ... |
|---|---|---|---|---|---|---|---|---|---|---|---|---|---|---|
| INPUT | a | b | c | d | e | f | g | h | i | j | k | l | m | ... |
| CLOCK | | | | | | | | | | | | | | ... |
| CLOCK of R1 | | | | | | | | | | | | | | ... |
| DATA of R1 | | a | (a) | c | (c) | e | (e) | g | (g) | i | (i) | k | (k) | ... |
| CLOCK of R2 | | | | | | | | | | | | | | ... |
| DATA of R2 | | | b | b | b | (b) | f | f | f | (f) | j | j | j | ... |
| CLOCK of R3 | | | | | | | | | | | | | | ... |
| DATA of R3 | | | | | d | d | d | d | d | d | d | (d) | m | ... |
| OUTPUT | | | a | | c | b | e | | g | f | i | d | k | ... |

DISCRETE WAVELET TRANSFORM APPARATUS FOR LATTICE STRUCTURE

BACKGROUND OF THE INVENTION

1. Field of the Invention

The present invention relates to a discrete wavelet transform apparatus for a lattice structure, and in particular to a discrete wavelet transform apparatus for a lattice structure which is capable of implementing a scalable discrete wavelet transform(DWT) of a lattice structure in which the number of registers used for a resolution level has a linearity with respect to the resolution level.

2. Description of the Background Art

Generally, a discrete wavelet transform(DWT) which is known as a tree structure subband analysis is directed to a hierarchical signal transform method. Each state forming a discrete wavelet transform(DWT) filters a low band component and high band component from a signal. The sampling ratio is decreased by 2 at each stage for thereby implementing a filtering operation.

The discrete wavelet transform(DWT) is used in various fields. For example, the DWT may be used for transferring a video image to a receiver side or compressing the same and may be used for an audio signal transmission. In the case of using the DWT for a video coding application, it is possible to prevent a resolution decrease at a boundary portion between blocks.

In order to use the discrete wavelet transform(DWT) in real time, a VLSI is required. Various methods are disclosed for implementing the VLSI. These methods will be explained as follows.

FIG. 1 illustrates an example for performing a DWT based on a quadrature symmetrical filter(QMF) of a 3-level (or 3-stage) tree structure. As shown therein, the 3-level signal processing system includes a signal transfer unit 11 having an analysis quadrature symmetrical filter(QMF) of FIG. 1A, and a signal receiving unit 12 having a synthesis quadrature symmetrical filter(QMF).

The signals are generally analyzed into narrow band signals, for this, an input signal u(n) is analyzed into a low band component by a low band pass digital filter 14 having a high band component and transfer function H(z) based on a high band pass digital filter 13 having a transfer function G(z) at a level 1. The filtered signal, namely, the discrete time signal filtered by the digital filter is down-sampled by ½. Namely, one of two sample values is removed from the filtered discrete time signal. At the levels 2 and 3, the above-described operation is repeated, so that an original signal is divided into a predetermined number of sub-band components. The signal is recovered to the original signal by the low band and high band combining filters 15 and 16 having transfer functions G'(z) and H'(z) of each level in the combining quadrature symmetrical filter(QMF) of the signal receiving unit 12. At this time, the sampling ratio is up-sampled by 2 times, and the signal is filtered.

As shown therein, four filters G(z), H(z), G'(z) and H'(z) have a perfect reconstruction property, and the filter banks which form each level are same and are duplicated. The number of samples which are computer for each sample is limited to maximum 2 irrespective of the number of levels based on the facts that the filtering speed is decreased at each level. This means that various level computations may be performed using one perfect reconstruction filter bank.

Generally, in order to implement a discrete wavelet transform(DWT) based on an integrated circuit, the discrete wavelet transform is classified into a direct type discrete wavelet transform(DWT) based on the type of a reconstruction filter bank and a discrete wavelet transform(DWT) using a lattice structure.

FIG. 2 illustrates an example for implementing a 3-level (resolution level exceeds 3) discrete wavelet transform (DWT) of a direct type. In particular, the length of the filter is 4. Compared to the example of FIG. 1, the high band pass digital filter 13 and the low band pass digital filter 14 are shown with respect to the signal transmission unit 11. In FIG. 2, reference numeral 17 represent a delay device of a word unit or a register. In addition, in the drawing, "/" represents a discrete time.

The digital filters 13 and 14 each include four FIR filter coefficients and $g_0$–3(n) and h-3(n) and are formed of four multipliers and four adders. The register stores an output of the current level based on a certain computation sequence, and uses when computing the next level. The construction of FIG. 2 illustrates one example and is directed to a structure formed by a design method capable of minimizing the number of registers.

The construction of FIG. 1 may be implemented in detail. However, if the resolution level and the length of the filter are changed, the construction is reformed. In this case, it is difficult to re-design the construction. In order to overcome the above-described problem, a more adaptive design method is disclosed as shown in FIG. 3. In this example, a routing network 18 is used. The routing network 18 is implemented by a register array or a memory and address generation unit(AGU). Even when the number of registers is greater than the example of FIG. 2, a scalable characteristic is provided with respect to any variation in the resolution level and the length of the filter.

As described above, when implementing a discrete wavelet transform(DWT), the discrete wavelet of the following lattice structure is provided except for adapting the direct type. The above-described example is shown in FIG. 4. As shown in FIGS. 2 and 3, the examples that the level is 3 and the length of the filter is 4 are implemented by the lattice structure. In this structure, since two lattices 19 and 20 require six multipliers and four adders, the complexity is decreased. The data controller 2 formed of delay devices installed between the lattices 19 and 20 requires eight delay units. In addition, the data form converter or the data storing unit 21 which are used for processing the data that the output x(n) is fed back to the input side require six delay units.

Even when the above-described lattice structure is adapted, whenever the resolution level is increased by one level, the number of the delay units is exponentially increased, so that the chip area is increased when implementing the lattice structure using the integrated circuit. As shown in FIG. 2, it is not easy to design the system because there is not a scalable characteristic.

SUMMARY OF THE INVENTION

Accordingly, it is an object of the present invention to provide a discrete wavelet transform apparatus for a lattice structure which is capable of simplifying the hardware structure and implementing a scalable characteristic with respect to the different resolution levels and different filter lengths.

To achieve the above-objects, there is provided a discrete wavelet transform apparatus for a lattice structure which includes:

first through M-th lattice lattices installed in series along the length of a selected filter and each having an upper signal path and a lower signal path for supplying an output of the discrete wavelet transform apparatus;

a data form transform unit for converting the form of the input signal and supplying to the first lattice stage; and wherein said data form transform unit, which receives an output of the upper signal path of the M-th lattice stage that the time $t_j(l)$ for receiving an allocation of a certain level among the resolution levels j is $2^j*1+2^{j-1}-1$. Note that this formula, and in a similar manner, formulas 1, 2a, 2b, 3b discussed below, and the formula in FIG. 6, can also be written as $(2^j)(1+2^{-1})-1$, with 1 replaced with l where appropriate. $2^j*1+2^{j-1}-1$ has the following relationship, wherein X represents an input of the data form transform unit, u(n) represents an input of the discrete wavelet transform(DWT), Y represents an output of the M-th lattice stage, n represents a discrete time, l represents a certain number, U represents an upper signal path, and L represents a lower signal path:

$$X^U_0(n)=u(n)\ n=2l$$

$$=Y^U_{M-1}(n-2^{j-1}),\ n=2^j*1+2^{j-1}$$

$$X^L_0(n)=u(n-1)\ n=2l$$

$$=Y^U_{M-1}(n-2^{j-1}-2^{j-2}),\ n=2^j*1+2^{j-1}-1$$

and includes a variable maintaining unit and signal selection unit which satisfy the above-described formulas, and when the time for receiving an allocation of a certain level among the resolution levels j is $t_j(l)=2^j*1+2^{j-1}-1$, the input and output of the delay control unit includes the following relationship, wherein x represents an input and Y represents an output, $$x^U_i(n)=Y^U_{i-1}(n)$$

$$X^L_i(n)=Y^L_{i-1}(n-2^j),\ n=2^j*1+2^{j-1}-1,$$

and a variable maintaining unit and signal selection unit which satisfy the above-described formulas are further provided.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 8 is a table illustrating a register allocation formed based on a life time chart of FIG. 7 according to the present invention;

FIG. 12 is a table illustrating a register allocation formed based on a life time chart of FIG. 11 according to the present invention;

FIG. 13 is a table illustrating a clock signal divide based on a register allocation table of FIG. 12 according to the present invention;

DETAILED DESCRIPTION OF THE PREFERRED EMBODIMENTS

The embodiments of the present invention will be explained with reference to the accompanying drawings.

Figure 1A:
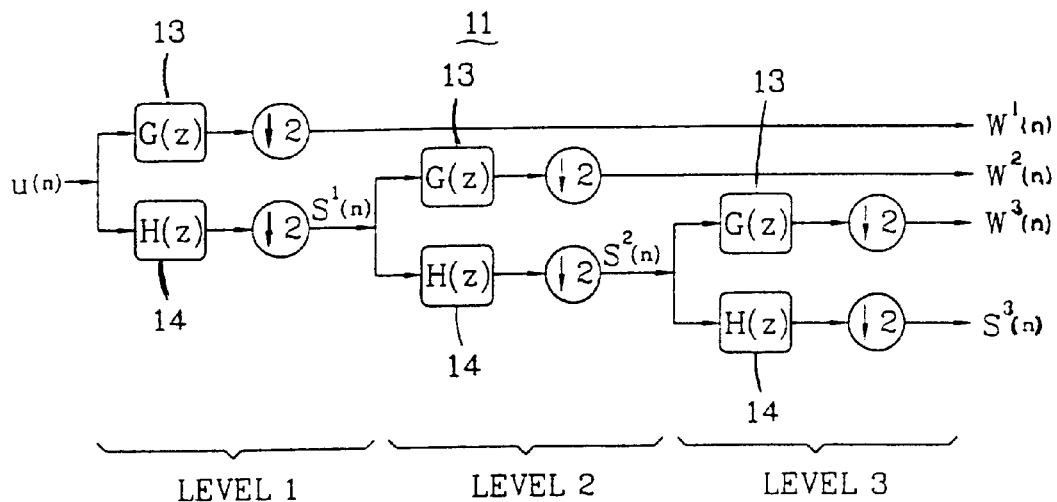
FIGS. 1A and 1B are block diagrams illustrating the construction for performing a discrete wavelet transform based on a symmetric filter(QMF) bank of a conventional 3-level tree structure.
Figure 1B:
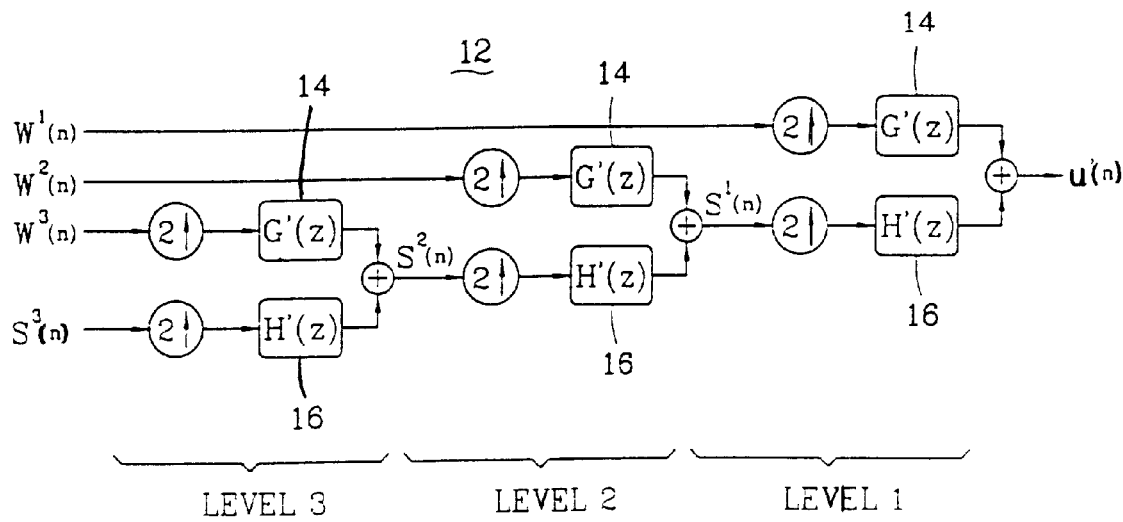
Figure 2:
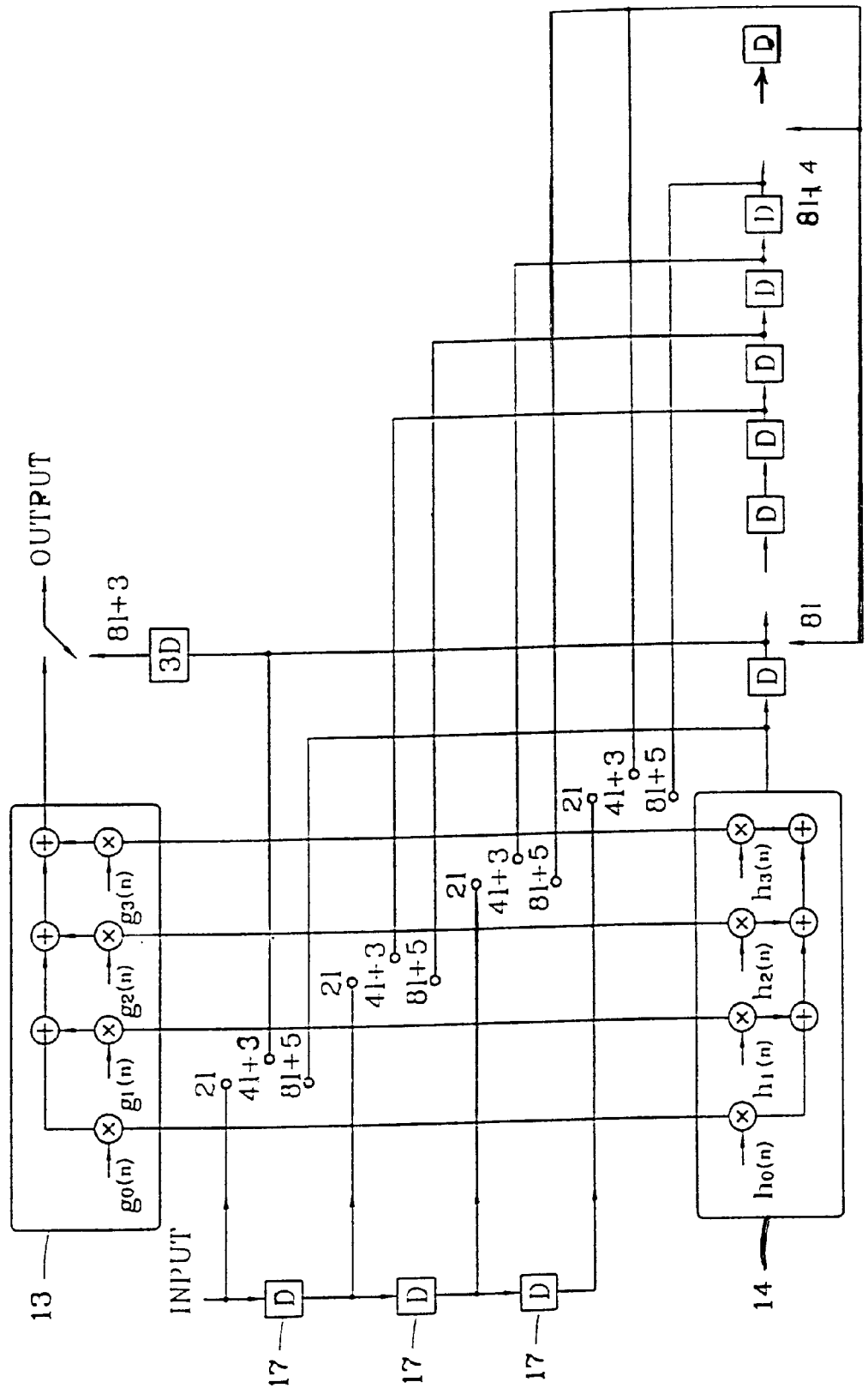
FIG. 2 is a view illustrating an example that the length of a filter is 4 for implementing a 3-level discrete wavelet transform(DWT) using a 2-channel quadrature symmetric filter(QMF) bank based on a conventional direct method.
Figure 3:
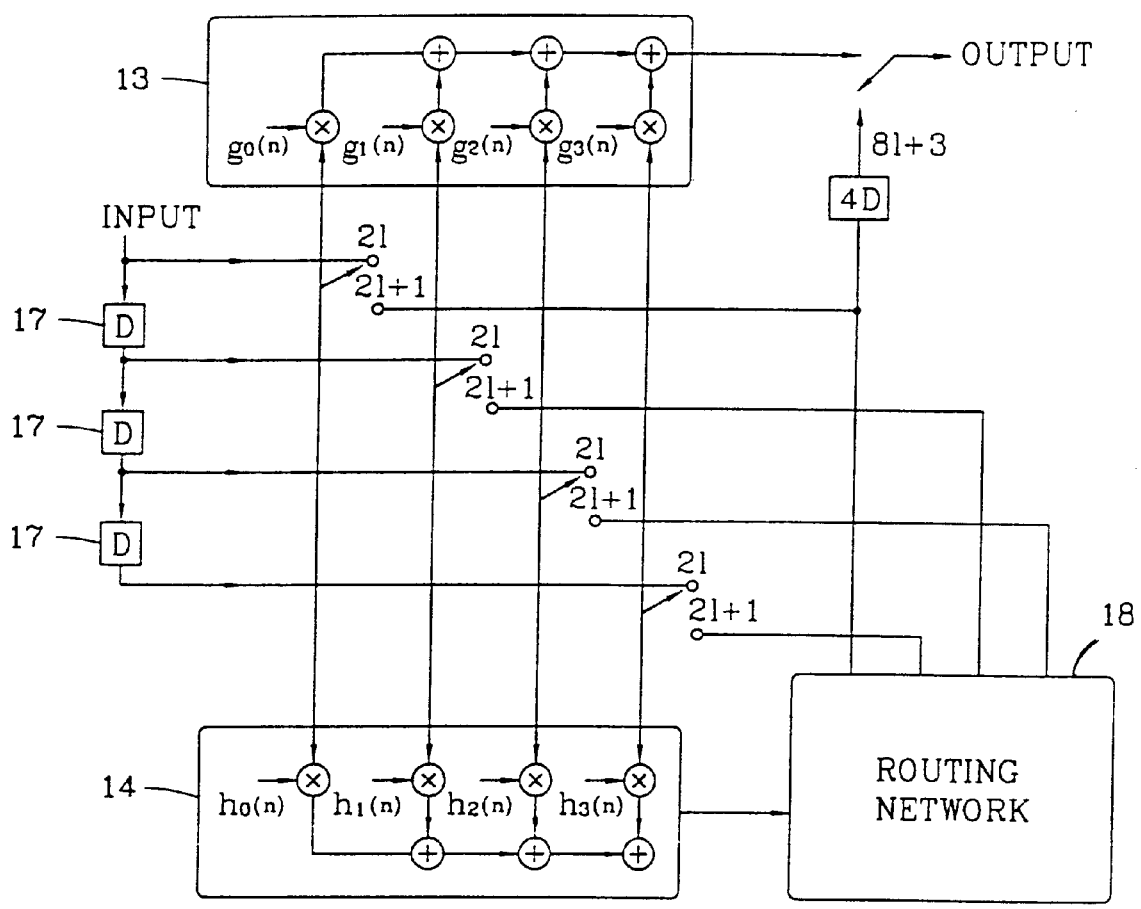
FIG. 3 is a view illustrating the construction for a discrete wavelet transform(DWT) having a routing network for explaining an example for implementing a 3-level discrete wavelet transform(DWT) using a 2-channel quadrature symmetric filter(QMF) bank based on a conventional direct method.
Figure 4:
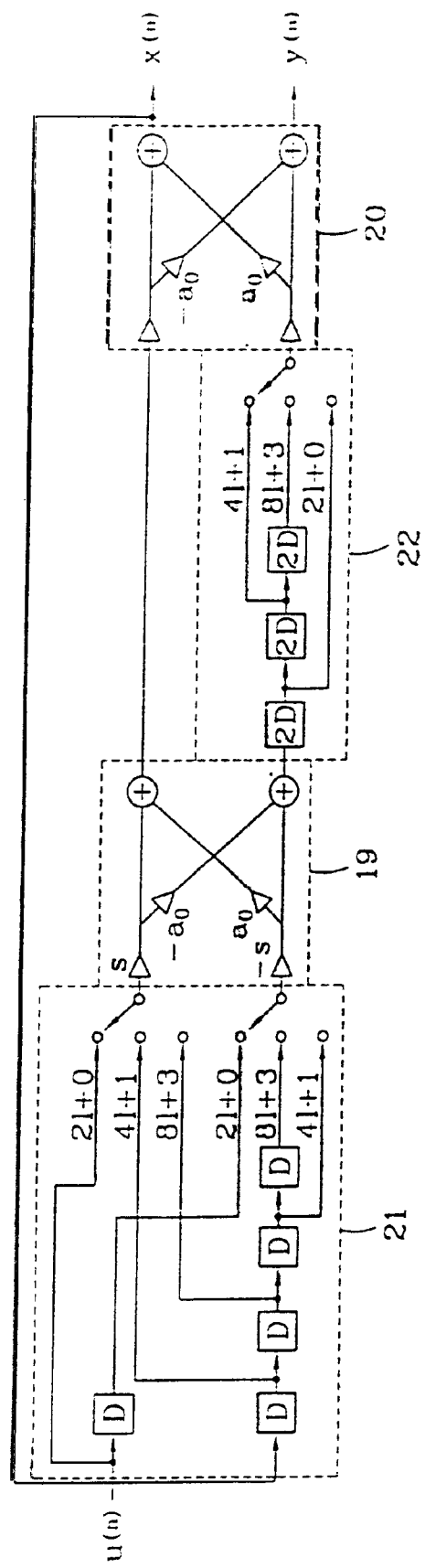
FIG. 4 is a view illustrating an implementation of a 3-level discrete wavelet transform(DWT) using a 2-channel quadrature symmetrical filter(QMF) based on a conventional lattice structure.
Figure 5:
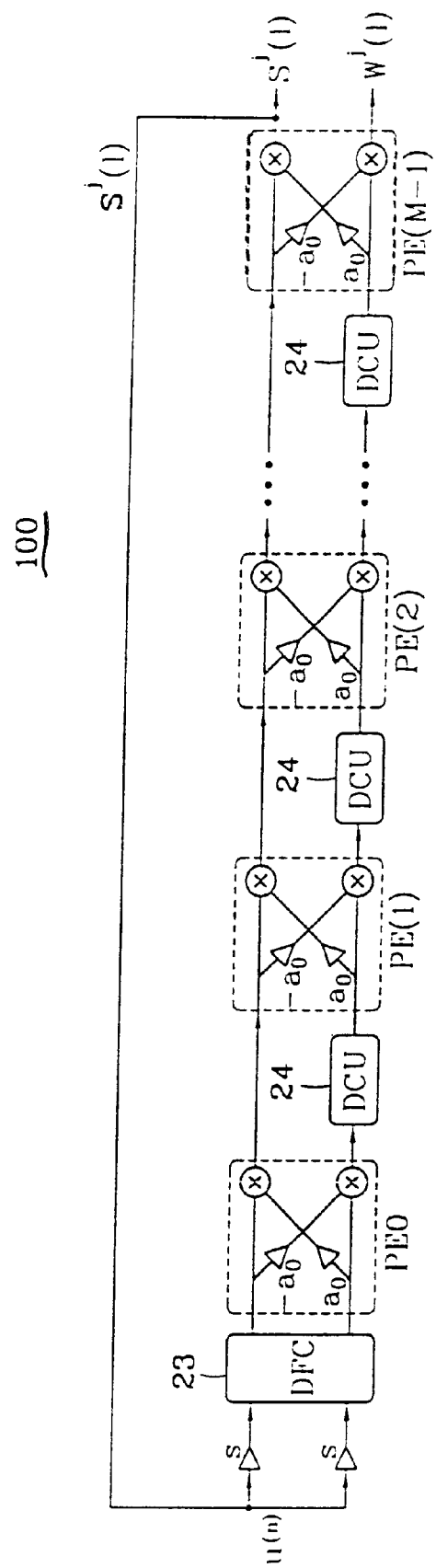
FIG. 5 is a block diagram illustrating a discrete wavelet transform(DWT) apparatus for a scalable lattice structure according to the present invention.

FIG. 5 illustrates the structure for implementing a scalable discrete wavelet transform(DWT) of a lattice structure according to the present invention.

As shown therein, a scalable discrete wavelet transform (DWT) apparatus 100 having a lattice structure according to the present invention includes a plurality of serially connected lattice stages PEO, . . . , PEM, a delay control unit 24 connected between the lattice stages, and a data form converter 23 installed between the input u(n) and the feeding output sj(l) of the first lattice stage PEO.

As shown in FIG. 5, a multiplier s is installed between the input u(n) and the data form converter 24 as a scale factor. Generally, a multiplier is used at upper and lower signal paths in addition to two multipliers installed at a signal path connecting the upper and lower signal paths. Since they have a common factor, the multiplier s is installed at a front state of the data form converter 23 for thereby decreasing the number of multiplies.

FIG. 5 illustrates a M number of lattice stages when the length of the filter is set to 2 m. In this example, it is possible to more sharply analyze when analyzing into sub-bands.

In the present invention, when the lengths of a 2M number of filters and the discrete wavelet transform(DWT) of 3-level are implemented using the apparatus of the present invention. The construction of the hardware included in each lattice stage may be same. However, as understood by the following detailed description, in the case of the delay controller 24, three registers are used, and three registers are used for the data form converter 23. Therefore, a smaller number of the devices is used in the present invention compared to the conventional art, and less complexity is obtained. Even when the resolution level is increased, since the hardware used for the delay controller 24 and the data form converter 23 is linearly increased, when the resolution level is high, it is possible to implement an effective apparatus.

Next, the construction of the delay controller 24 and the data form converter 23 will be explained in detail.

In order to compute all levels of the discrete wavelet transform(DWT) using one lattice filter bank, a schedule that "Each level must be computed at a certain discrete time" is previously set. This schedule must be determined based on the following conditions. Therefore, it is possible to design the discrete wavelet transform(DWT) having a certain level.

1) When indicating the level number as "j" at the resolution level "J", the output at the level "j" must be computed at every 2j time.

2) When indicating a certain discrete time as "/", the (2I)th and (2I−1)th outputs of the level "j−1" are fed back to compute the n-th output of the level "j". For this, the (2I)th and (2I−1)th output time of the level "j−1" must be determined to be earlier than the I-th output time of the level "j".

Figure 6:
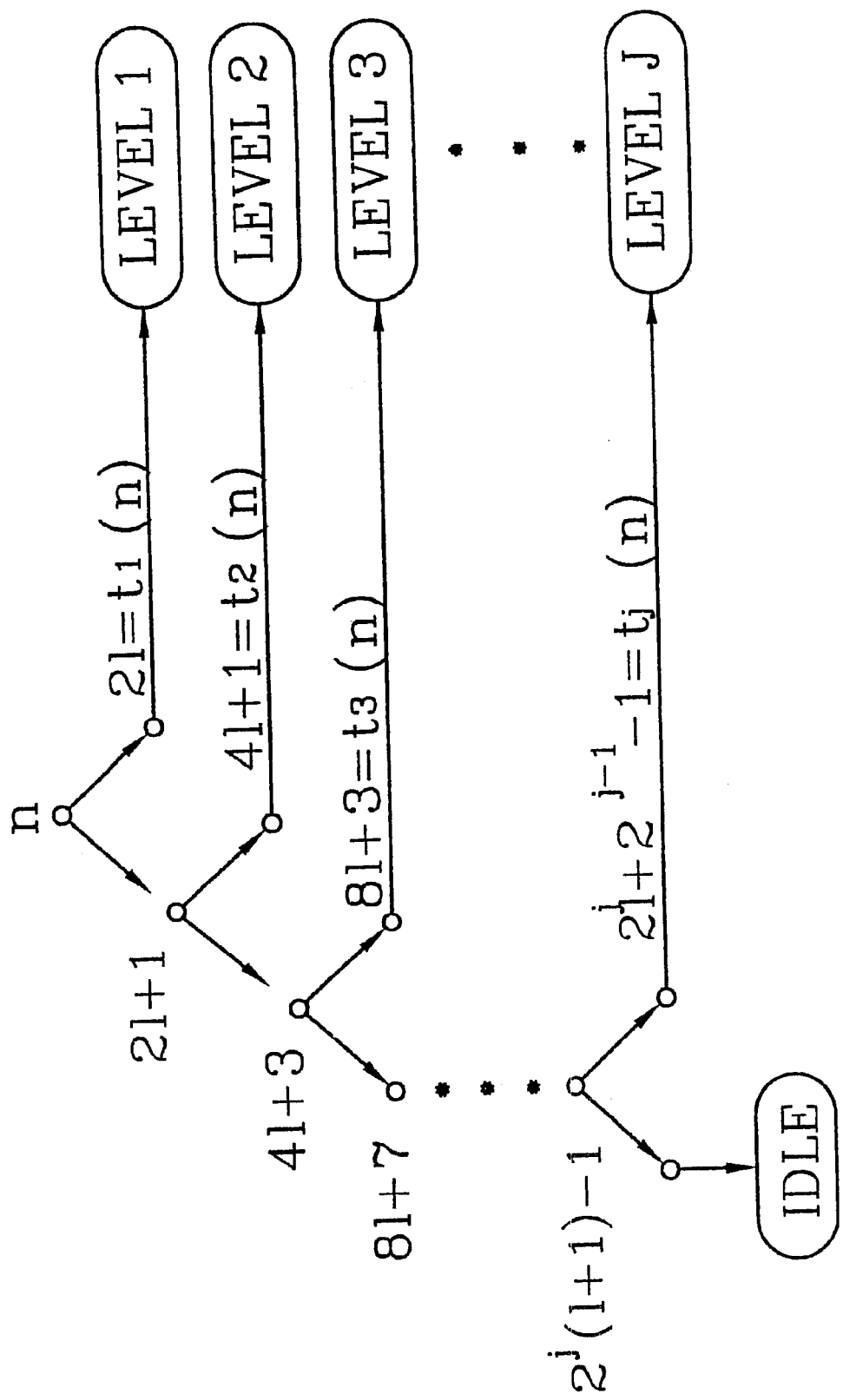
FIG. 6 is a view illustrating a design method using a binary tree structure related to a certain design according to the present invention.

For the above-described schedule design, in the present invention, as shown in FIG. 6, a design method which uses a binary tree structure is used.

Assuming that the number of the levels is "J" with respect to the discrete wavelet transform(DWT) is generally determined, in the present invention, the quantized time "n" is divided by the even number time 2I and the odd number time 2I−1.

First, since the level 1 among a J number of levels must be performed first, the time 2I is allocated to the time for performing the level 1.

Next, the (2I+1) is divided by the (4I+1) and (4I+3) time, and the (4I+1) at the side of the (2I+1) is allocated to the filtering time of the level 2.

In this manner, as shown in FIG. 6, the time to the level J are allocated for each level, so that the allocated time, namely, determined schedule, satisfy the conditions 1 and 2. the time when a certain level "j" is allocated among the level J may be expressed as follows based on the above-described conditions.

$$t_j(I) = 2^j * I + 2^{j-1} - 1 \quad \text{Formula 1}$$

In this formula, $t_j(I)$ represents time for a I-th filtering of the level j.

The lattice has two signal paths. One signal path is an upper signal path indicated using a character U, and the other signal path had a low signal path indicated using a character L. As shown in FIG. 5, it is possible to obtain a certain input/output relationship in which the output of the last lattice ($PEM_{M-1}$) and the $Y^U_{M-1}(n)$ and $Y^L_{M-1}(n)$ are obtained as the input of the first lattice($PE_0$) and $X^U_0(n)$ $Y^L_0(n)$, and the above-described result may be expressed by the following formulas 2a and 2b.

$$Y^U_0(n) = u(n) \qquad n = 2I, \qquad \text{Formula 2a}$$
$$= Y^U_{M-1}(n - 2^{j-1}), \qquad n = 2^j * 1 + 2^{j-1}$$

$$Y^L_0(n) = u(n - 1) \qquad n = 2I, \qquad \text{Formula 2b}$$
$$= Y^U_{M-1}(n - 2^{j-1} - 2^{j-2}), \quad n = 2^j * 1 + 2^{j-1}$$

In addition, the input/output relationship between the lattices may be expressed based on the following formulas 3 and 3b.

$$X^U_j(n) = X^U_{j-1}(n) \qquad \text{Formula 3a}$$

$$X^L_i(n) = Y^L_{i-1}(n - 2^j), \; n = 2^{j}*1 + 2^{j-1} \qquad \text{formula 3b}$$

Therefore, it is possible to determine whether a certain level is computed based on the interrelationship between the lattices and time. The case that the resolution level is 3 will be explained according to the present invention.

In the case that the resolution level is 3, the interrelationship between the output lattice stage and the input that the output is fed therefrom may be expressed by the following formulas 4a and 4b.

$$X^U_0(n) = u(n) \qquad n = 2I, \qquad \text{Formula 4a}$$
$$= Y^U_{M-1}(n - 1), \quad n = 4I + 1$$
$$= Y^U_{M-1}(n - 2), \quad n = 8I + 3$$

$$X^L_0(n) = u(n - 1) \qquad n = 2I, \qquad \text{Formula 4b}$$
$$= Y^U_{M-1}(n - 3), \quad n = 4I + 1$$
$$= Y^U_{M-1}(n - 6), \quad n = 8I + 3$$

In addition, in the case that the resolution level is 3, the input/output relationship between the lattice stages may be expressed by the following formulas 5a and 5b.

$$X^U_i(n) = Y^U_{i-1}(n) \qquad \text{Formula 5a}$$

$$X^L_i(n) = Y^L_{i-1}(n - 2) \quad n = 2I, \qquad \text{Formula 5b}$$
$$= Y^L_{i-1}(n - 4), \quad n = 4I + 1$$
$$= Y^L_{i-1}(n - 8), \quad n = 8I + 3$$

In the case that the resolution level is 3, another input/output relationship may be obtained based on time between the lattices of FIG. 5. After a certain design is performed, a lifetime chart is formed for a register allocation when performing the above-described design. As a result of the chart formation, in the case that the resolution level is 3, the number of the registers is 3.

The register may be determined based on various variables during a certain time. The number of the variables to be memorized at a certain time from the life time chart is counted, and the maximum value is set for the number of minimum registers used for implementing the delay control unit 24 and the data form converter 23. First, the designing process of the data form converter 23 will be explained.

Figure 7:
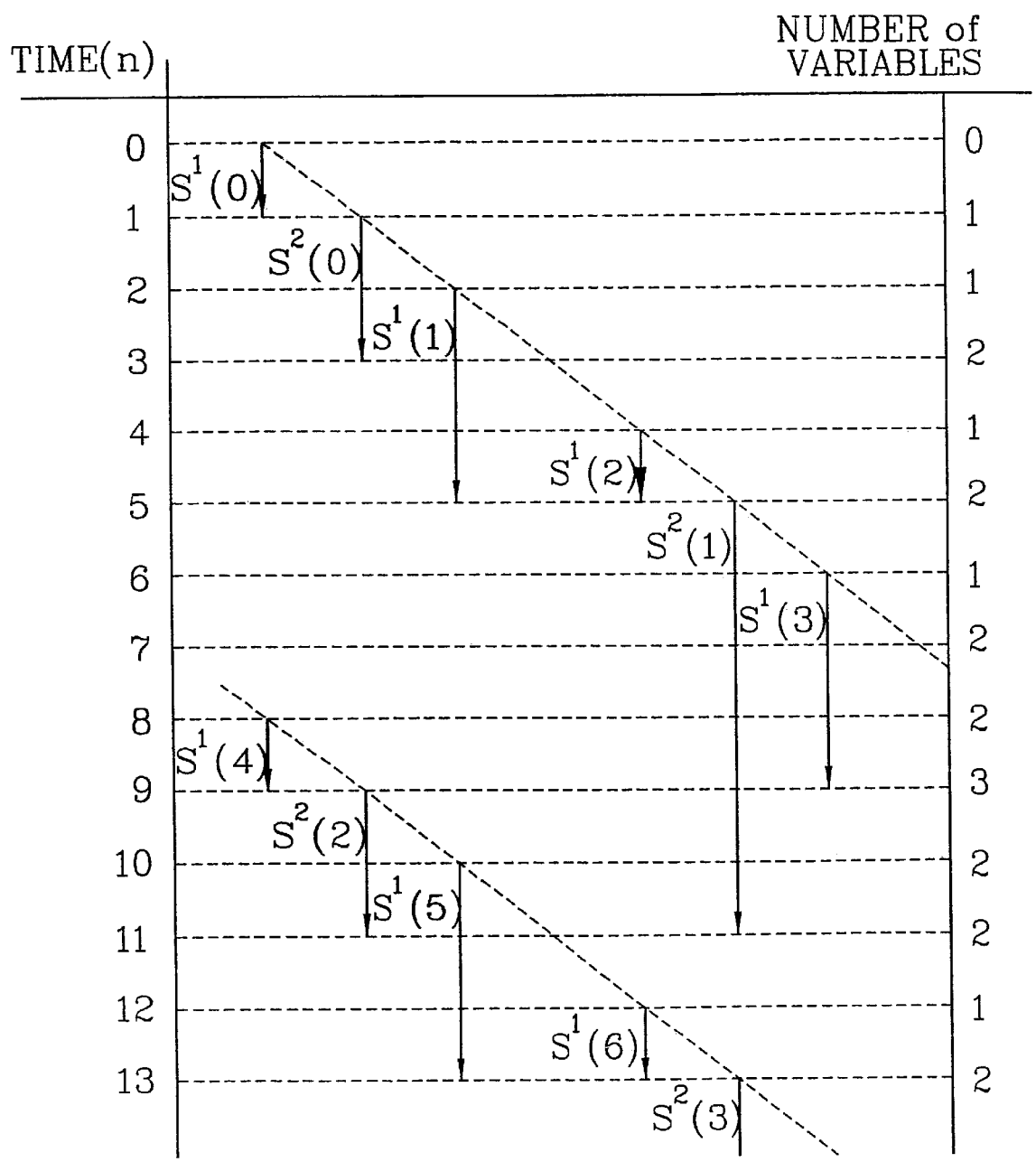
FIG. 7 is a table illustrating an example of a life time chart of a variable with respect to a data form converter(DFC) of FIG. 5 when a resolution level is 3 according to the present invention.

FIG. 7 illustrates an example of the life time chart of the variables with respect to the data form converter 23 of FIG. 5 based on the formulas 4a and 4b when the resolution level is 3.

Formula 4a is adapted for the data form converter 23 with respect to the upper signal path of the lattice stage, and Formula 4b is adapted for the data form converter 23 with respect to the lower signal path.

As seen in Formula 4a, the time n is started at 0 for the upper signal path and is discretely increased by one unit. The lift time chart may be formed based on the period for maintaining the transmitted value. Namely, the maintained value among the increased n-values is used and provided to the upper signal path of the first lattice stage.

As seen in Formula 4a, at the time when N is even number, since the input u(n) is directly used, there are not variables to be stored. At the time of 1, 5, 9, . . . when the discrete time n is 4I/1, since the just fed value is used, one variable may be stored during the unit time. At the time of 3, 11, 19, . . . when the discrete time n is 8I/3, since the fed value before two units is used, the variable is stored during the two-unit time.

Therefore, as seen in the life time chart, since the output value of the output lattice $PE_{M-1}$ stores the value before one unit at the time when the discrete time n is 1, 5, 9, . . . with respect to the upper signal path, variables $S^1(0), S^1(2), S^1(4)$, . . . are used. The character "s" is shown in FIG. 5. In addition, when the time n is 3, 11, 19, . . . with respect to the upper signal path, the variables $S^2(0), S^2(2), S^2(4)$ are used so that the output value from the output lattice $PE_{M-1}$ maintains the value before the two units.

For the lower signal path, since Formula 4b is used, variables $S^1(1), S^1(3), S^1(5)$ are used so that the output value from the output lattice $PE_{M-1}$ maintains the value before the three units at the time when the time n is 1, 5, 9, . . . in the above-described manner. Variables $S^2(1), S^2(3), S^2(5)$ are used so that the output value from the output lattice $PE_{M-1}$ maintain the value before the six units at the time when the time n is 3, 11, 19, . . .

In the case of the upper and lower signal paths, each variable may be indicated by the length of the arrow with respect to the discrete time n of the vertical axis as shown in FIG. 7. Therefore, it is possible to compute the number of variables used during a discrete time as shown in the right side column of FIG. 7, so that it is possible to recognize that the maximum number of variables is 3 which corresponds to the resolution level 3.

In order to constitute the data form converter 23 in a hardware construction of FIG. 5 based on the life time chart, the variable of each register as shown in FIG. 8 is allocated. The allocating method will be explained.

A certain input which is received at a certain time is allocated to an empty register, and the data stored in the allocated register is continuously stored until the stored value is not needed. As a result, the register allocation table of FIG. 8 is obtained. Since the number of the registers which is required for an embodiment of FIG. 7 is 4, the registers R1, R2 and R3 are used for an embodiment of FIG. 8. In the embodiment of FIG. 7, at the time of N=1, $S^1(0)$ is required. $S^1(0)$ us stored by the unit time of 1 into the first register R1 of FIG. 8. In addition, at the time of n=3, $S^2(0)$ is required. Therefore, $S^2(0)$ is stored into the first register R1 for the two unit time. Therefore, it is possible to form the register allocation table of FIG. 8 for thereby implementing a certain hardware construction.

Figure 9:
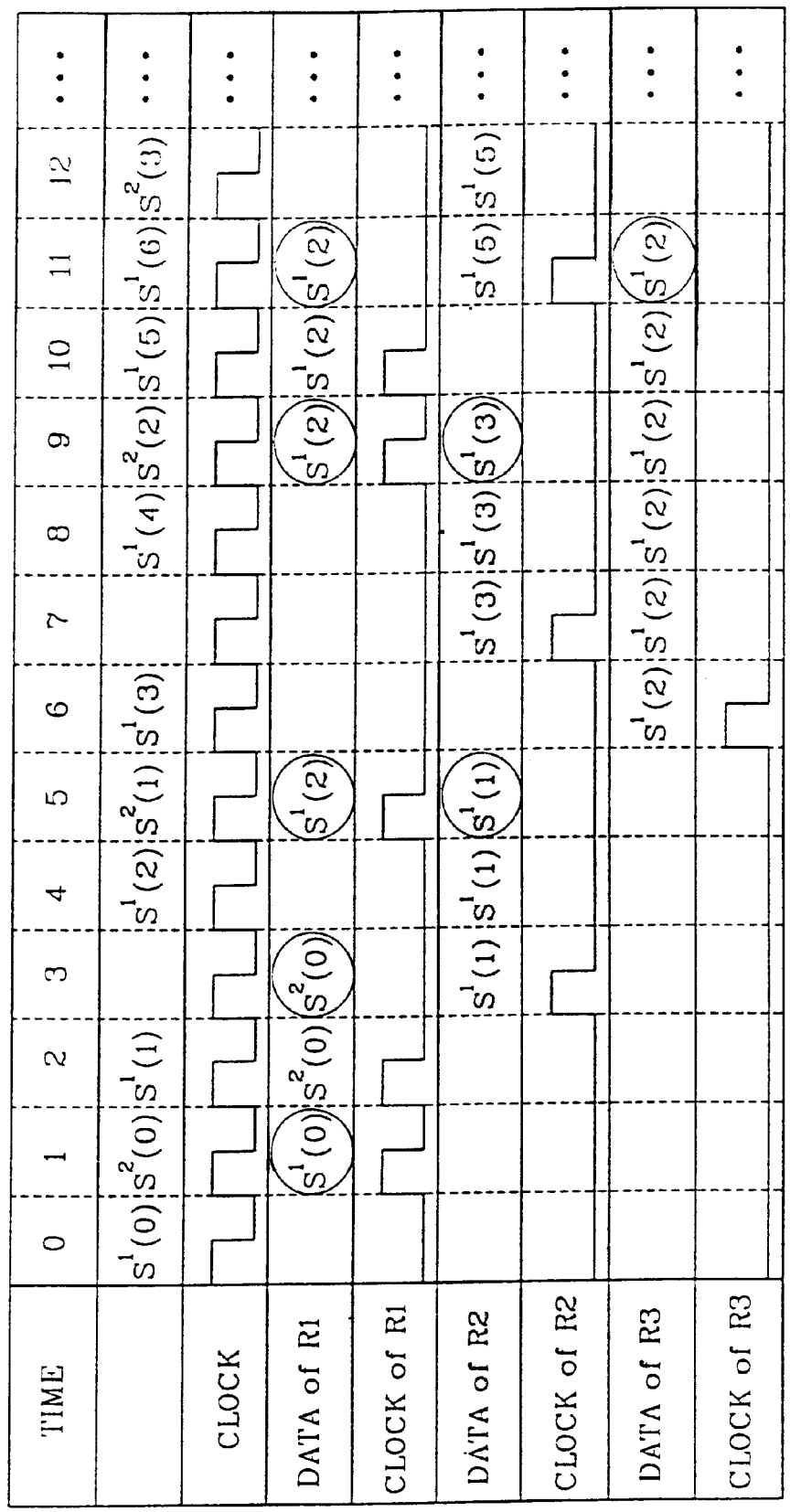
FIG. 9 is a table illustrating a clock signal divide based on a register allocation table of FIG. 8 according to the present invention.

Next, a proper loading operation is implemented by applying a clock at the time when the data is stored into the allocated register. In the present invention, the clock divide table of FIG. 9 is formed for thereby more easily implementing a certain hardware construction. Since FIG. 9 illustrates a timing that the clock signal of each register is applied based on the embodiment of FIG. 8, the detailed description thereof will be omitted.

In the case that the resolution level is 3, the detailed construction with respect to the data form converter 23 will be explained with reference to the tables of FIGS. 8 and 9. This method is shown in FIG. 10.

Figure 10:
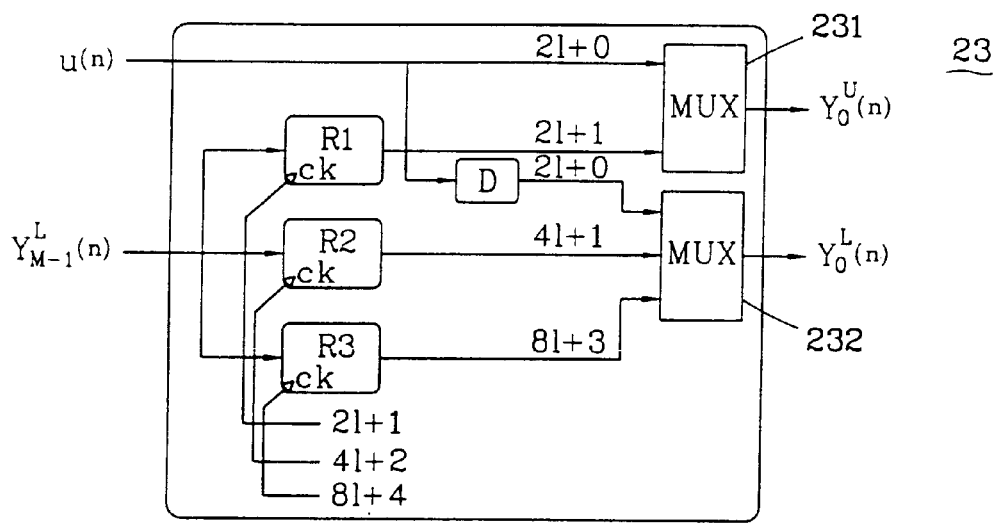
FIG. 10 is a block diagram illustrating a detailed construction with respect to a data form conversion(DFC) when a resolution level is 3 with reference to the tables of FIGS. 8 and 9.

FIG. 10 illustrates the constriction of the data form converter 23 when the resolution level is 3 with reference to FIGS. 8 and 9. As shown therein, three registers R1, R2 and R3 are used. In the drawings, 2I/+0, 2I/+1, . . . represent that data are transmitted to the multiplexers 231 and 232 during a certain time. In the case of the register, a clock signal is applied at a corresponding time.

The data form converter 23 as shown in FIG. 10 may be adapted to FIG. 5.

In the above-described embodiment, three registers are used for storing variables in the case that the resolution level is 3. However, in the present invention, the embodiment is not implemented only based on the case that the resolution level is 3. The case that the resolution level exceeds 4 may be adapted, so that the data form converter 23 as shown in FIG. 10 can be implemented. The forms as shown seen in Formulas 4a and 4b may be formed with respect to the resolution level based on Formula 2, so that a certain design is obtained in the above-described manner. Therefore, in the present invention, even when the resolution level is increased, the number of the registers is linearly increased.

Next, the method for designing the delay control unit 24 based on Formula 5 in which the resolution level is 3 will be explained.

Figure 11:
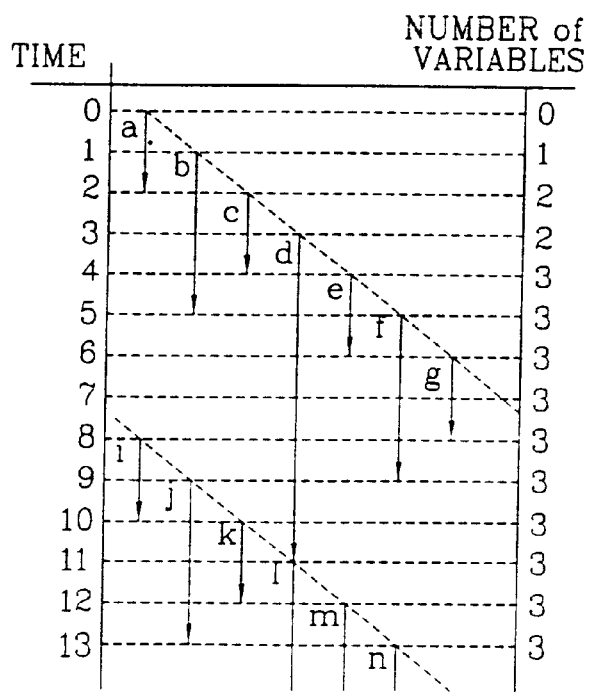
FIG. 11 is a table illustrating an example of a life time chart of a variable with respect to a delay control unit(DCU) of FIG. 5 when a resolution level is 3 according to the present invention.

FIG. 11 illustrates a life time chart of a variable with respect to the delay control unit 24 as shown in FIG. 5 based on Formulas 5a and 5b when the resolution level is 3.

For the upper signal path, Formula 5a is adapted with respect to the delay controller 24, and for the lower signal path, Formula 5b is adapted with respect to the delay controller 24.

As seen in Formula 5a, since an input is directly used for a certain n time of the upper path, there is no variable to be stored.

For the lower signal path, since formula 5b is used, at the time when the discrete time n is 2, 4, 6, . . . , the variables a, c, e, g, i, . . . are used so that the output value from the previous lattice maintain the value before two units, and at the time when time n is 1, 5, 9, 13, . . . , variables b, f, j, . . . , are used so that the output value from the previous lattice maintain the value before four units, and at the time when the time n is 3, 11, 19, . . . , the variables d, I, . . . are used so that the output value from the previous lattice maintains the value before 8 units.

The lifetime of each variable may be indicated by the length of the arrow with respect to the discrete time n of the vertical axis as shown in FIG. 11, so that it is possible to compute the number of the variables used for a corresponding discrete time as shown in the right side column of FIG. 11. Therefore, it is recognized that the number of the maximum variables is 3, and the resolution level is 3.

In order to construct the delay control unit 24 in a hardware form based on the lifetime chart, the variables are allocated to each register as shown in FIG. 12. As described above, a certain input which is inputted at a certain time is allocated to an empty register, and the register allocation table of FIG. 12 is formed in such a manner that the data stored in the allocated register are continuously stored until the stored value becomes invalid. Namely, as shown in FIG. 12, since the number of the register is 3, the registers R1, R2 and R3 are used. As shown in FIG. 11, at the time of n=2, the value "a" is used. For this, the value "a" is stored into the first register R1 of FIG. 12 for the two unit time, so that it is possible to form a register allocation table of FIG. 12 with reference to FIG. 11. Next, at the first time when the data are stored into the allocated register, the clock signal is applied for thereby implementing a proper loading operation. In the present invention, the clock divide table of FIG. 13 is formed, so that a certain hardware construction is easily implemented.

As shown in Tables of FIGS. 11 and 12, a detailed construction with respect to the delay control unit 24 is implemented in the case that the resolution level is 3 with reference to the tables of FIGS. 11 and 12. The above-described embodiment is shown in FIG. 14.

Figure 14:
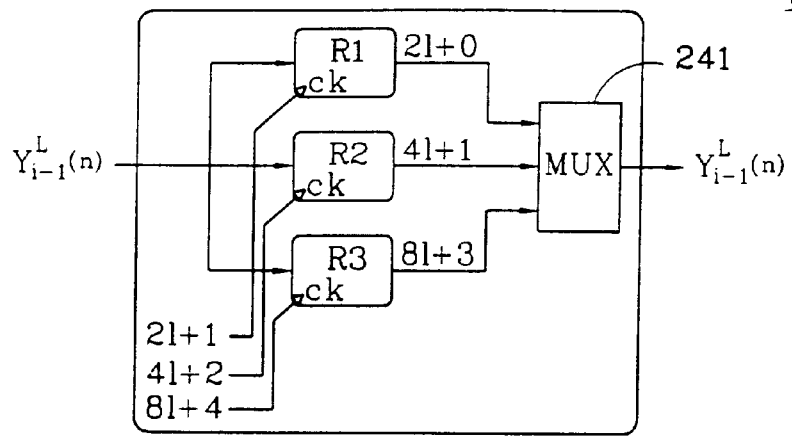
FIG. 14 is a view illustrating a detailed construction of a delay control unit(DCU) when a resolution level is 3 with reference to the tables of FIGS. 12 and 13.

FIG. 14 illustrates the construction which is implemented with respect to the delay control unit with reference to FIGS. 12 and 13 in the case that the resolution level is 3. As shown therein, three registers R1, R2 and R3 are used. In the drawing, 2I/+0, 2;/+1, . . . , etc. represent that the data are transmitted to a corresponding multiplexer 241 at a corresponding time. Un the case of the register, a clock signal is applied at a corresponding time.

As shown in FIG. 14, the delay control unit 24 may be adapted to the embodiment of FIG. 5.

In the above-described embodiment, when the resolution level is 3, three registers are used for storing variables. However, in the present invention, the resolution level is not limited thereto. When the resolution level exceeds 4, it is possible to implement the delay control unit 24 as shown in FIG. 14 in the above-described manner. It is possible to obtain the form as shown in Formula 5 with respect to the resolution level based on Formula 3, and a certain design according to the present invention is implemented based on the above-described manner. In the present invention, even when the resolution level is increased, the number of the registers is linearly increased.

Figure 15:
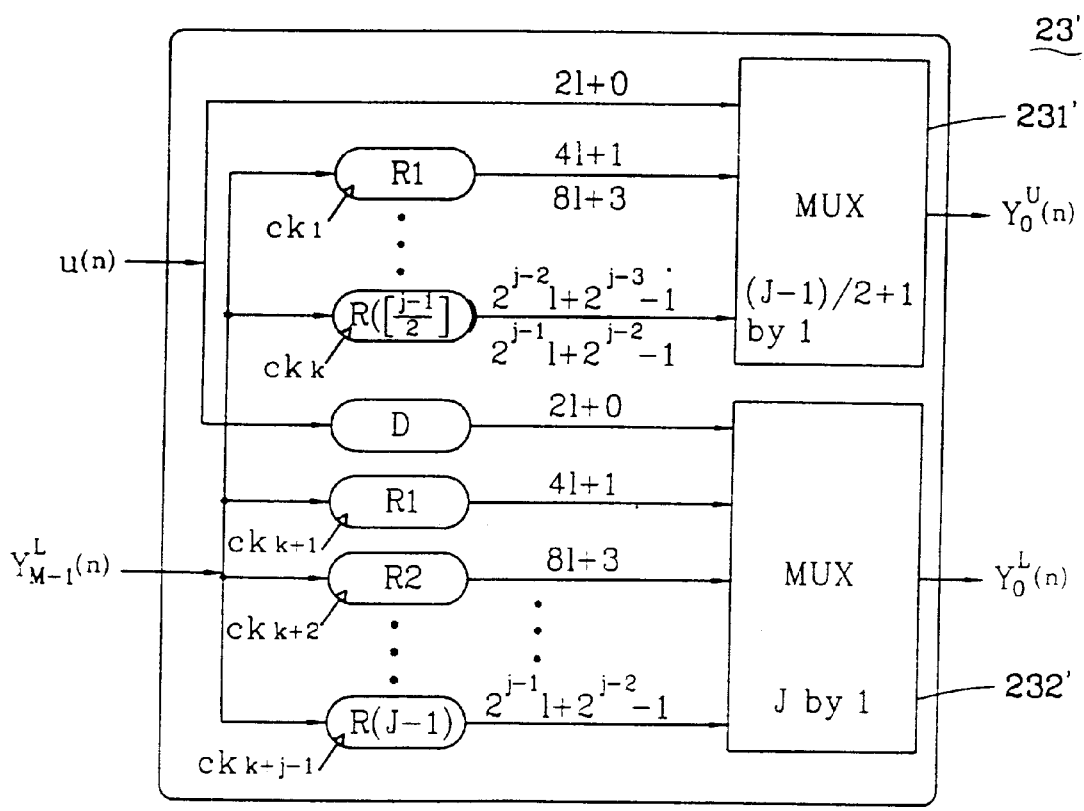
FIG. 15 is a view illustrating the construction of a data form converter(DFC) with respect to a certain resolution level "j" according to the present invention.
Figure 16:
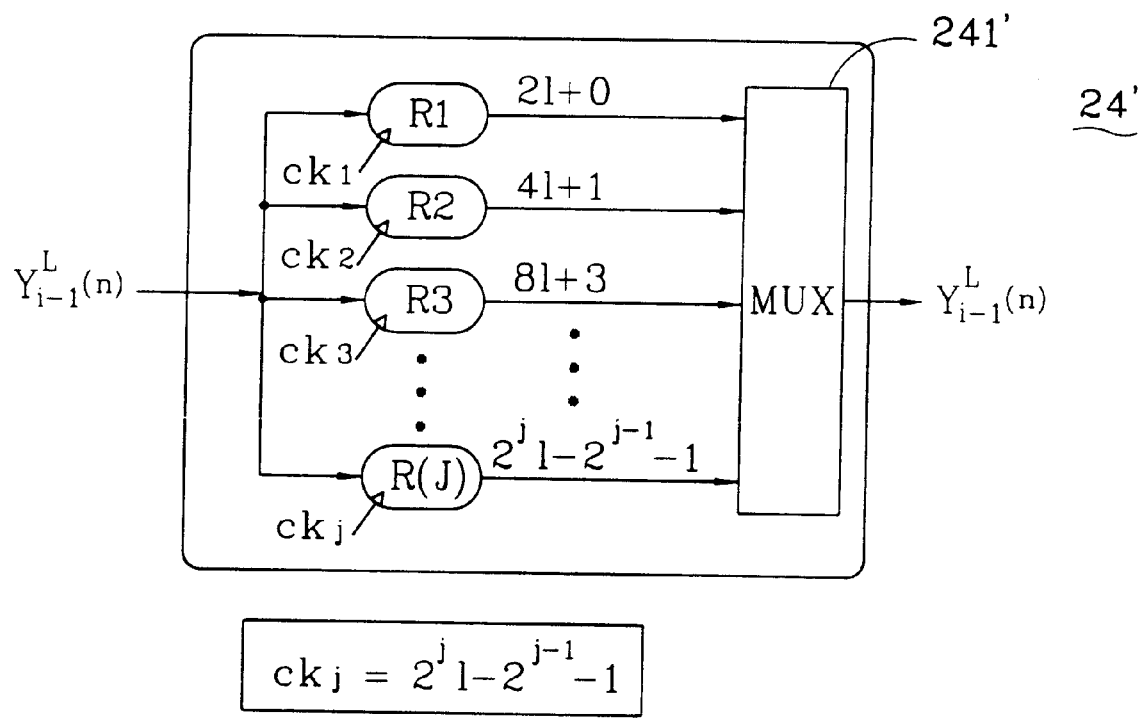
FIG. 16 is a view illustrating the construction of a delay control unit(DCU) with respect to a certain resolution level "j" according to the present invention.

FIGS. 15 and 16 illustrate the constriction of the delay control unit 24' and the data form converter 23' with respect to a certain resolution level J.

FIG. 15 illustrates the general construction of the data form converter(DFC) as shown in FIG. 5. As shown therein, the data form converter 23' includes a plurality of registers R1, . . . , R[(J−1)/2] of the first group installed in parallel in the manner similar to the construction of the delay control unit 24', and a plurality of registers d, $R_1$, . . . , $R_{J-1}$ of the second group installed in parallel, and another multiplexer 232' for selectively outputting the outputs of the registers D, $R_1$, . . . , $R_{J-1}$.

In the drawings, 2I+0, 4I+1, 8I+3 represent the time selected. For example, assuming that n is 0, 1, 2, . . . , since n=2I represents the (2n)th time, the value inputted at this time is transmitted to the multiplexer. In addition, 2I+1, 4I+2 and 8I+2 defined as the input of the clock signal ck of the register represent that the clock signal ck is applied to a corresponding register at that time when the time n corresponds thereto. In addition, the input/output of the upper side of the lattice is indicated using a superscrip U, and the input/output of the lower side of the lattice is indicated using a superscript L, so that the input and output are expressed as follows: u(n), $Y^L_{M-1}(n)$, $X^U_0(n)$, $X^L_0(n)$.

FIG. 16 illustrates the general construction of the delay control unit(DCU) as shown in FIG. 5. As shown therein, the delay control unit 24' includes a plurality of registers R1, . . . , RJ installed in parallel, and a multiplexer 241' for selectively outputting the outputs of the registers R1, . . . , RJ. The delay control unit 23' is installed in the same form for each delay control unit DCU.

As described above, since the delay control unit DCT and the data form converter DFC may be formed in a regular and module structure, it is possible to easily change the construction of the same in accordance with the design method of the system.

As indicated by $R_{J-1}$ of FIG. 15 and $R_j$ of FIG. 16, the number of the registers according to the present invention has a linear interrelationship with respect to the resolution level J compared to the exponential increase of the conventional art. In the present invention, even when the level J is increased, it is possible to implement a certain design.

As described above, in the present invention, since the discrete wavelet transform(DWT) is implemented based on the lattice structure, it is possible to decrease use of the adder and multiplier by ½ compared to the quaratuate symmetric filter(QMF) of the FIR method.

Since it is possible to implement the delay control unit DCU and the data form converter DFC using a minimum number of registers, the number of the registers is not exponentially increased due to the increase of the resolution level for thereby significantly decreasing the area of the VLSI chips.

In the present invention, since a scalable characteristic is provided, it is possible to easily design the system with respect to a certain system requirement such as the resolution level or the length of the filter.

The discrete wavelet transform(DWT) structure according to the present invention has a scalable characteristic and provided a hardware-based advantage based on the lattice structure 100. In the present invention, it is possible to implement an effective discrete wavelet transform(DWT) structure having a certain resolution level and the length of the filter based on a designing method. Those who skilled in the art may easily implement an effective image compression and audio transfer method using the discrete wavelet structure according to the present invention.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. In an apparatus for a discrete wavelet transform, a discrete wavelet transform apparatus of a lattice structure, comprising:

first through M-th lattice lattices installed in series along the length of a selected filter and each having an upper signal path and a lower signal path for supplying an output of the discrete wavelet transform apparatus;

a data form transform means for converting the form of the input signal and supplying to the first lattice stage; and a delay control means connected between the lattice stages, wherein said data form transform means, which receives an output of the upper signal path of the M-th lattice stage that the time $t_j(l)$ for receiving an allocation of a certain level among the resolution levels j is $(2^j)(1+2^{-1})-1$, has the following relationship, wherein X represents an input of the data form transform means, u(n) represents an input of the discrete wavelet transform (DWT), Y represents an output of the M-th lattice stage, n represents a discrete time, l represents a certain number, U represents an upper signal path, and L represents a lower signal path:

$X^u_0(n)=u(n)$ $n=2l$ $=Y^u_{M-1}(n-2^{j-1})$, $n=(2^j)(1+2^{-1})$ $X^L_0(n)=u(n-1)$ $n=2l$ $=Y^u_{M-1}(n-2^{j-1}2^{j-2})$, $n=(2^j)(1+2^{-1})-1$, and includes a variable maintaining means and signal selection means which satisfy the above-described formulas, and when the time for receiving an allocation of a certain level among the resolution levels j is $t_j(l)=(2^j)(1+2^{-1})-1$, the input and output of the delay control means includes the following relationship, wherein x represents an input and Y represents an output, $$x^U_j(n)=Y^U_{j-1}(n)$$

$$X^L_j(n)=Y^L_{j-1}(n-2^j), n=(2^j)(1+2^{-1})-1,$$

and a variable maintaining means and signal selection means which satisfy the above-described formulas are further provided.

2. The apparatus of claim 1, wherein said variable maintaining means of the data form transform means includes a plurality of registers for receiving an output u(n) and an output of the M-th lattice stage and maintaining the above-described operation for a certain time, and said signal selection means includes a first multiplexer for selectively supplying an output of the register to an upper signal path of the first lattice stage, and a second multiplexer for selectively supplying an output of the register to the upper signal path of the second lattice stage.

3. The apparatus of claim 1, wherein said delay control means includes a plurality of registers for receiving an output of the previous block and maintaining the above-described operation for a certain time, and said signal selection means includes a multiplexer for selectively supplying an output of the register to a lower signal path of the next lattice stage.

4. The apparatus of claim 2, wherein the number of said registers is linearly increased in accordance with the resolution level.

5. The apparatus of claim 1, wherein said variable maintaining means and signal selection means has the following relationship, wherein the time for receiving an allocation of a level among the resolution levels j is $t_j(l)=(2^j)(1+2^{-1})-1$, X represents an input of the data form transform means, u(n) represents an input of the discrete wavelet transform apparatus, Y represents an output of the M-th lattice stage, n represents a discrete time, l represents a certain number, U represents an upper signal path, and L represents a lower signal, $$V^U_0(n)=u(n)\ n=2l$$

$$=Y^U_{M-1}(n-2^{j-1}),\ n=(2^j)(1+2^{-1})-1$$

$$V^L_0(n)=u(n-1)\ n=2l$$

$$=Y^U_{M-1}(n-2^{j-1}-2^{j-2})\ n=(2^j)(1+2^{-1})-1,$$

and includes a first variable maintaining means and second signal selection means which are connected between the lattice stages, and when the time for receiving a level among the resolution levels j is $t_j(l)=(2^j)(1+2^{-1})-1$, the input/output of the delay control means, wherein X represents an input and Y represents an output, has the following relationship, $$X^U_j(n)=Y^U_{j-1}(n)$$

$$X^L_j(n)=Y^L_{j-1}(n-2^j)\ n=(2^j)(1+2^{-1})-1$$

and includes a second variable maintaining means and a second signal selection means which satisfy the above-described formulas.

6. The apparatus of claim 5, wherein said second variable maintaining means includes a plurality of registers for receiving an output of the lattice stage of the previous stage and maintaining the above-described operation for a certain time, and said second signal selection means includes a multiplexer for selectively supplying an output of the register to a lower signal path of the next lattice stage.

* * * * *